(12) United States Patent
Amat Roldan et al.

(10) Patent No.: US 10,249,054 B2
(45) Date of Patent: Apr. 2, 2019

(54) METHOD AND DEVICE FOR AUTOMATED PARAMETERS CALCULATION OF AN OBJECT

(71) Applicant: EXPERT YMAGING, SL, Barcelona (ES)

(72) Inventors: Ivan Amat Roldan, Barcelona (ES); Iker Bilbao Aresté, Alcover (ES); David Verde López, Barcelona (ES)

(73) Assignee: EXPERT YMAGING, SL., Barcelona (ES)

( * ) Notice: Subject to any disclaimer, the term of this patent is extended or adjusted under 35 U.S.C. 154(b) by 0 days.

(21) Appl. No.: 15/319,110

(22) PCT Filed: May 22, 2015

(86) PCT No.: PCT/IB2015/000734
§ 371 (c)(1),
(2) Date: Dec. 15, 2016

(87) PCT Pub. No.: WO2015/193711
PCT Pub. Date: Dec. 23, 2015

(65) Prior Publication Data
US 2017/0124727 A1    May 4, 2017

(30) Foreign Application Priority Data
Jun. 17, 2014  (EP) .................................. 14002083

(51) Int. Cl.
*G06T 7/62* (2017.01)
*G01B 11/02* (2006.01)
(Continued)

(52) U.S. Cl.
CPC ............... *G06T 7/62* (2017.01); *G01B 11/02* (2013.01); *G01B 11/14* (2013.01); *G01B 11/24* (2013.01);
(Continued)

(58) Field of Classification Search
None
See application file for complete search history.

(56) References Cited

U.S. PATENT DOCUMENTS 9,129,404 B1 *  9/2015  Wagner .................. G06Q 30/00
2005/0257748 A1  11/2005  Kriesel et al.
(Continued)

FOREIGN PATENT DOCUMENTS

EP  1148316 A1  10/2001
EP  2662659 A1  11/2013
(Continued)

OTHER PUBLICATIONS

Doeschl, A. B. et al., "The relationship between the body shape of living pigs and their carcass morphology and composition", Animal Science 2004, 73-83.
(Continued)

*Primary Examiner* — Matthew C Bella
*Assistant Examiner* — Brian D Shin
(74) *Attorney, Agent, or Firm* — Silvia Salvadori (57) ABSTRACT

The method comprising: acquiring, by a two-dimensional camera (7), in a scene, a two dimensional image of at least one object (200); identifying the object (200) within the acquired two dimensional image; calculating, by a first means, the size of a pixel of the object (200) in the acquired and segmented two dimensional image taking into account the distance between the object (200) and the two-dimensional camera (7); and calculating, by a second means, several parameters including at least the size, dimensions, body part dimensions, body features, weight and/or volume of the object (200) by using said calculated size of the pixel and an a priori model of the object (200), wherein said a priori model includes information linking different parts, contours or shapes representative of several objects (200), (Continued)

previously acquired with a two-dimensional camera, with several parameters said several objects (200).

15 Claims, 9 Drawing Sheets

(51) Int. Cl.
*G01B 11/14* (2006.01)
*G01B 11/28* (2006.01)
*G01B 21/04* (2006.01)
*G01B 11/24* (2006.01)

(52) U.S. Cl.
CPC ............ *G01B 11/28* (2013.01); *G01B 21/042* (2013.01); *G06T 2207/10004* (2013.01); *G06T 2207/10016* (2013.01); *G06T 2207/30188* (2013.01); *G06T 2207/30252* (2013.01)

(56) References Cited

U.S. PATENT DOCUMENTS

| | | |
|---|---|---|
| 2008/0140234 A1 | 6/2008 | Shafter |
| 2009/0240432 A1* | 9/2009 | Osanai ................... G08G 1/165 701/300 |
| 2010/0222684 A1 | 9/2010 | Hatzilias et al. |
| 2013/0064432 A1* | 3/2013 | Banhazi ................ G06T 7/0083 382/110 |
| 2014/0028842 A1* | 1/2014 | Abramson ............. H04N 7/188 348/143 |
| 2014/0314276 A1* | 10/2014 | Wexler .................. G06T 3/0012 382/103 |

FOREIGN PATENT DOCUMENTS

| | | |
|---|---|---|
| WO | 2004012146 A1 | 2/2004 |
| WO | 2010063527 A1 | 6/2010 |
| WO | 2010098954 A2 | 9/2010 |

OTHER PUBLICATIONS

Love, Jaclyn Elyse 'Video Imaging for Real-Time Performance Monitoring of Growing-Finishing Pigs'. Thesis. University of Guelph, 2012.

International Preliminary Report on Patentability of International Parent Application No. PCT/IB2015/000734 dated Sep. 5, 2016.

Demand letter for International Report on Patentability of International Parent Application No. PCT/IB2015/000734 dated Mar. 31, 2016 addressed to the European Patent Office.

International Search Report of International Parent Application No. PCT/IB2015/000734 dated Sep. 16, 2016.

* cited by examiner

Fig. 1

Linear and area measures from the visual image analysis (VIA) system.

METHOD AND DEVICE FOR AUTOMATED PARAMETERS CALCULATION OF AN OBJECT

RELATED APPLICATIONS

This application is the US national phase application of international application number PCT/IB2015/000734, filed 22 May 2015, which designates the US and claims priority to European Patent Application No. EP14002083.5 filed 17 Jun. 2014, the contents of each of which are hereby incorporated by reference as if set forth in their entireties.

FIELD OF THE INVENTION

The present invention relates to a method and to a device for automatically calculating parameters of an object, for instance the size, dimensions, body part dimensions, body features, volume, weight and other related data allowing defining said object, which preferably would be an animal such as a livestock animal.

The invention can be used for a fast, accurate and individualised animal weighting that is of particular interest for the agro food industry as profit strongly depends on this.

BACKGROUND OF THE INVENTION

Fast, accurate and individualised calculation or estimation of an animal weight is important in many commercial fields. In agriculture, for example, estimation of carcass weight is important in efficient livestock processing operations, such as growth control and pricing. Accurately estimating a livestock animal's weight and/or final carcass weight can result in significant cost savings to the livestock producers, as they are often penalised when any of the animals they produce have a weight or volume outside of the range determined by the slaughter. Also, growth monitoring, feeding optimisation and management of batches is currently done in an uncontrolled manner, and accuracy of the methods relies on producer's criteria.

There exist a number of approaches to accurately weight animals; however, these are based on the use of scales which are logistically impractical and stressful for the animals, which less to an overall reduction of the yield. For instance, the most common approach to estimate the weight of a pig is based on experience after visual evaluation of the producer.

In an experimental evaluation on a sample of 45 pigs it has been found that overall pig weighting based on observation was indeed correlated. For this specific test the inventors of this invention has found that root mean squared error was about 6.4 Kg for pigs ranging from 70 to 140 Kg. This resulted in a Pearson's correlation of 0.90 and $R^2$ coefficient of 0.80. Obviously, this result is a reference and variability in error might depend in many factors that might increase or reduce overall accuracy. This leads to the conclusion that observation has an important degree of uncertainty, which is a disadvantage for business.

Optiscan currently commercialized by Ro-main (disclosed in US-20100222684) is based on three dimensional (3D) imaging of the pig and subsequent processing of data to estimate the overall pig weight.

Other known technologies to estimate body conditions of animals are disclosed in WO-A1-2010/063527 providing an arrangement that comprises a three-dimensional camera system directed towards the animal and provided for recording at least one three-dimensional image of the animal, and an image processing device connected to the three-dimensional camera system and provided for forming a three-dimensional surface representation of a portion of the animal from the three-dimensional image recorded by the three-dimensional camera system; for statistically analyzing the surface of the three-dimensional surface representation; and for determining the body condition score of the animal based on the statistically analyzed surface of the three-dimensional surface representation.

Also WO-A2-2010/098954 discloses methods, systems, and apparatus for estimating physical parameters using three dimensional representations. In this case, predetermined light patterns are projected onto an object and light patterns resulting from an interaction of the projected light patterns and portions of the object are detected. Three dimensional locations of multiple light elements in the detected light pattern are determined, and physical parameters of the object, for example, weight, are estimated based on the locations.

Similarly, WO-A1-2004/012146 presents an imaging method and system for use in automatic monitoring the body condition of an animal. A predetermined region of interest on the animal body is imaged, and data indicative of the acquired one or more images is processed to obtain a three-dimensional representation of the region of interest. The three-dimensional representation is analyzed to determine a predetermined measurable parameter indicative of a surface relief of the region of interest which is indicative of the body condition of the imaged animal.

US-A1-2005257748 discloses a method and apparatus for measuring the physical characteristics of livestock animals such as cattle and hogs. The apparatus of this patent application includes a plurality of strategically positioned cameras that are used to obtain data concerning volumetric, curvilinear (surface) and linear measurements of the livestock animals and the full carcasses thereof. The data is then analysed to provide information that substantially assists the commercial producer of livestock animals in producing a high-quality end-product for the consumer while adding profitability to the enterprise.

Finally, US-A1-2008/0140234 discloses a method for remotely directing a fishing tournament making use of a data network over which participants transmit submissions indicating sizes of fish caught. In this case, this patent application allows performing the submissions by including digital images of fish. Moreover, the size of the fish may be determined from a scale established using a reference object depicted in the image.

Figure 1:
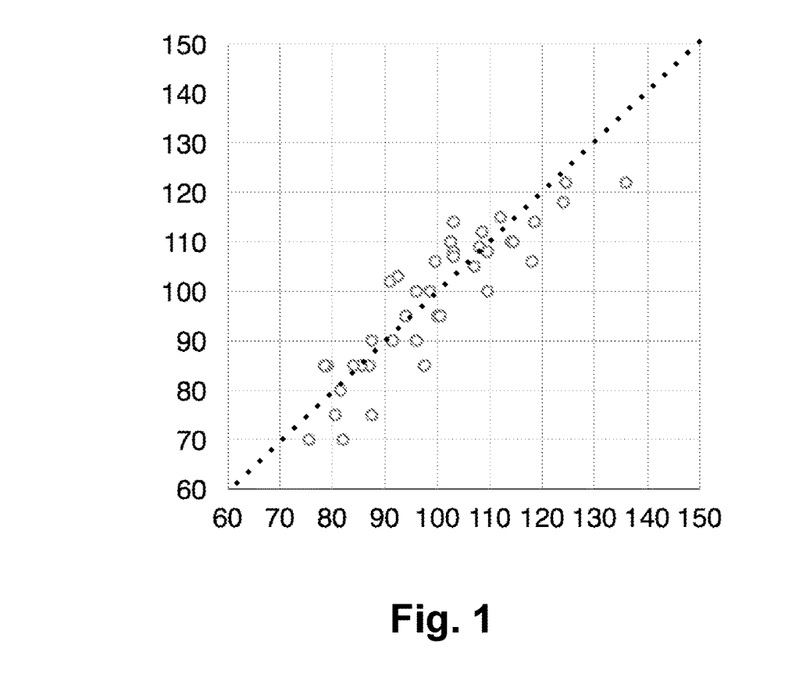
FIG. 1 shows the scattering plot of real pig weight on a scale (x-axis) and estimated weight based on an expert (y-axis).
Figure 2:
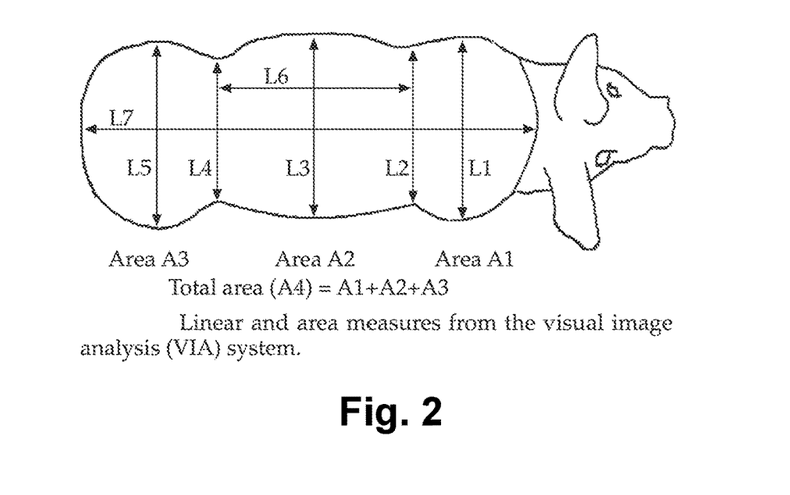
FIG. 2 is a figure extracted from [1], explaining the body parts required to be measured for estimating weight of a pig.

Apart from that, Visual image analysis (VIA) uses aerial-view images of animals to determine body surface dimensions and may be used for real-time monitoring of pig growth [1]. FIG. 2 shows an example of body parts used to compute the pig weight. A UK company is currently commercializing the implementation of this work to monitor pig growth. Recently, a PhD Thesis [2] evaluated the ability of Qscan to accurately estimate: (1) live body weight (BW) of individual pigs, and (2) mean BW for groups of pigs. Conclusions of this work were to not recommend Qscan for predicting BW of individual pigs.

The present invention provides further improvements in the field.

REFERENCES

[1] A. B. Doeschl et. al. 'The relationship between the body shape of living pigs and their carcass morphology and composition'. Animal Science 2004, 73-83.

[2] Jaclyn Elyse Love. 'Video Imaging for Real-Time Performance Monitoring of Growing-Finishing Pigs'. Thesis. University of Guelph, 2012.

DESCRIPTION OF THE INVENTION

The present invention proposes the use of a device that can include embedded processing means (there could also be located remotely) for the calculation, or estimation, of parameters of an object or part of an object, for instance size, volume, weight, roughness, volume efficiency, surface, ripeness, content, quality, color purity, status, health, maturation, surface roughness, similarity, mood, visual attention, probability of bumping or collision between two or more objects and other related parameters of said object or objects, which could be an animal such as a livestock animal, a human, a crop, turf, compost, people faces, or products in a storage room.

To that end, present invention provides in a first aspect a method for automated parameters calculation of an object, or part of an object. The proposed method comprises acquiring, by a two-dimensional camera, in a scene, a two dimensional image of at least one object, and identifying said object within the acquired two dimensional image by segmenting, via a segmentation algorithm, the two dimensional image. In addition, the method comprises calculating, by a first means, the size of a pixel of the object in the acquired and segmented two dimensional image taking into account the distance between the object and the two-dimensional camera; and calculating, by a second means, several parameters of the object including at least the size, dimensions, body part dimensions, body features (including a body fat index), weight and/or volume by using said calculated size of the pixel and an a priori model of the object.

The a priori model in accordance with an embodiment is stored in a memory or database of a computing system, and includes information linking different parts, contours or shapes representative of several objects, previously acquired with a two-dimensional camera, with several parameters including the size, dimensions, body part dimensions, body features, weight and/or volume of said several objects. For example, it is known that a pig weight can be calculated from its body shape, and more particularly, by measuring different body parts of a pig, like those reported in [1].

Alternatively to the a priori model, said several parameters may be calculated by using the calculated size of the pixel and a heuristic model.

In accordance with an embodiment, the method also acquires a sequence of two dimensional images and/or video images.

In accordance with an embodiment, a reference object or a feature of a known size included in the scene is used for calculating the size of the pixel of the object.

In accordance with yet another embodiment, the calculation of the size of a pixel of the object in the acquired and segmented two-dimensional image and the calculation of the several parameters is performed by a remote server including at least one processing unit. This is done by the remote server previously receiving at least the acquired two dimensional image, through a communication network such as internet, via a local area network (LAN) or a general wide area network (WAN), or any other communication means.

In addition, the remote server can built a map to represent a spatial distribution of the calculated parameters, to monitor a temporal evolution of the calculated parameters, or to perform a combination of the represented spatial distribution and monitored temporal distribution. The built map then can be used to optimize at least pig growth, crop management, turf management, compost management, stock management, stock pricing, vision attention, marketing of products, mapping of pig production or reliability of producers, overall yield for a year and/or a predicted yield for the next season or years.

In addition, present invention provides in a second aspect a device for automated parameters calculation of an object or objects, or part thereof. According to the invention, the proposed device at least includes:

a two-dimensional camera provided for being directed towards said object or objects and for acquiring a two dimensional image (or even a sequence of two dimensional images and/or a video images) of the object or objects;

segmentation means included in a processor arranged and configured to segment the acquired two dimensional image to identify the object within the acquired two dimensional image;

first calculation means, comprising a distance sensor configured to measure the distance between the device and the object or objects, arranged and configured to calculate the size of a pixel of said object or objects (i.e. establishing the size, and also if needed the orientation, of at least one pixel nearby the object or objects) in the acquired and segmented two dimensional image; and second calculation means arranged and configured to calculate several parameters of the object or objects preferably including size, dimensions, body part dimensions, body features (including a body fat index), weight and/or 3D volume, by using said calculated size of the pixel of the object or objects and an a priori model.

According to an embodiment, the first means include a second camera to have an stereoscopic vision, which enable to estimate the distance to the object or objects of interest.

Regarding the distance sensor, this could be of any time and can be based in different technologies, like ultrasound, RF, microwaves, LED or laser telemetry, among others.

To be noted that by segmentation it has to be understood a process that partitions a digital image into segments. In general, segmentation assigns a label to every pixel within the digital image and all pixels with the same label share certain characteristics. Segmentation is typically used to locate objects and boundaries (lines, curves, etc.) in images. There are a number of many different approaches that enable to segment digital images and here are listed a number of them that can be used for segmenting the two dimensional image (or even the sequence of two dimensional images and/or video images):

Thresholding, this is probably the simplest method to segment an image. This thresholding can be directly applied to image intensity, in gray scale or RGB, or any image feature obtained by combining spatial information within the image or information from other images (stored in a database, temporal, arbitrary, pattern . . . ).

Clustering methods are based on known algorithms like Gaussian mixture models and k-means that group segments based on their common properties of one or multiple image features and/or variables.

Compression-based segmentation which minimizes the coding length of an image.

Histogram-based methods use the information of a group of pixels in the form of a distribution to group the segments.

Edge detection methods; use the information of boundaries and sharp changes in intensity to identify the limits of a segment.

Region growing methods, group together those neighbouring pixels with similar properties. If a similarity criterion is satisfied, the pixel can be set to belong to the segment as one or more of its neighbors.

Partial differential equation-based methods, by solving the Partial differential equation by a numerical scheme, one can segment the image.

Graph partitioning methods, which model the impact of pixel neighborhoods on a given cluster of pixels or pixel, under the assumption of homogeneity in images.

Watershed methods, which consider the gradient magnitude of an image as a topographic surface. Pixels having the highest gradient magnitude intensities (GMIs) correspond to watershed lines, which represent the region boundaries.

Model-based methods, which assume that structures of interest have a repetitive form of geometry. Therefore, one can seek for a probabilistic model towards explaining the variation of the shape of the organ and then when segmenting an image impose constraints using this model as prior. Such a task involves (i) registration of the training examples to a common pose, (ii) probabilistic representation of the variation of the registered samples, and (iii) statistical inference between the model and the image. State of the art methods in the literature for knowledge-based segmentation involve active shape and appearance models, active contours and deformable templates and level-set based methods.

Multi-scale segmentation, for which a series of image segmentations are computed at multiple scales. Hierarchical segmentation is an example of this approach.

Machine learning-based segmentation, for which techniques like neural networks or support vector machines are used to develop a model for segmentation based on training the computer on a known databased with correct segmentations. For example, pulse-coupled neural networks (PCNNs) are neural models proposed by modeling a cat's visual cortex and developed for high-performance biomimetic image processing.

Model fusion-based segmentation, finally an approach containing a number of the above methods is combined to optimize the performance of the final segmentation.

Depending on the model complexity the first and/or second means to calculate the object or objects parameters can be, entirely or in part, included in the proposed device or in a remote server located in a cloud computing environment.

The proposed device may also include additional means in order to improve its usability or 'user experience'. For example, a way to tag which object or objects are being evaluated. This can be accomplished by including a display and tag the object by any mean, like highlighting the object, coloring the object or objects being evaluated. Alternatively, identification means such as a laser pointer or some illumination control can be used to indicate to users which object or objects are being evaluated.

Additionally, in some configurations of the proposed device it might be required to include additional synchronization/association signaling when this property is not already built-in. For example, electronic control might synchronize a device for taking the two dimensional image, sequence of images and/or video sequence, and the external sensor if required. This signal can be asynchronous, established on some time information based on Greenwich Mean Time (GMT), or by any other time reference.

The device can be also embedded in an unmanned vehicle. The unmanned vehicle could be aerial such as a drone, terrestrial, or maritime, and might be particularly useful to build maps for crops or turf management.

The device of the second aspect of the invention is adapted to perform the method of the first aspect of the invention.

BRIEF DESCRIPTION OF THE DRAWINGS

The previous and other advantages and features will be more fully understood from the following detailed description of embodiments, with reference to the attached, which must be considered in an illustrative and non-limiting manner, in which:

FIG. 5 illustrates another exemplary embodiment of the proposed device for automated parameters calculation of an object in accordance with some embodiments of the present invention.

DETAILED DESCRIPTION OF SEVERAL EMBODIMENTS

Figure 3:
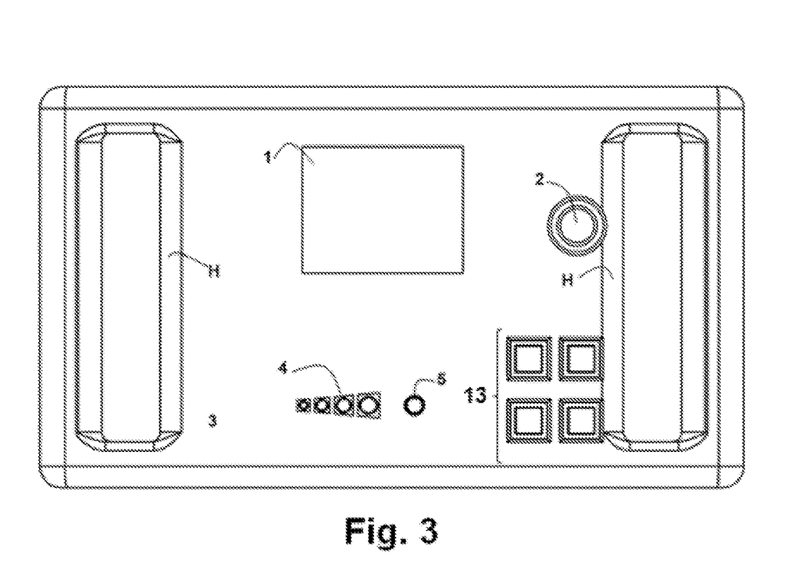
FIG. 3 illustrates a frontal view of an exemplary embodiment of the proposed device for automated parameters calculation of an object in accordance with some embodiments of the present invention.
Figure 4:
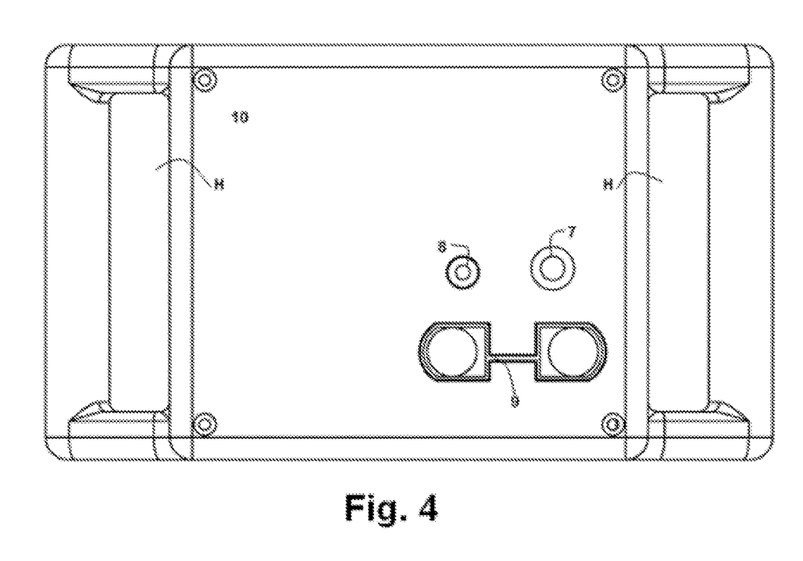
FIG. 4 is a rear view of the proposed device of FIG. 3.

FIGS. 3 and 4 illustrate an example embodiment of the device 100 of the second aspect of the invention. According to this particular embodiment, the proposed device 100 comprises two handles H operable by an operator of the device 100. FIG. 3 is a frontal view of the device 100 which according to this particular embodiment preferably includes located in a frontal housing 3 of the device 100: a touchpad display 1, a control button 2, an indicator of battery life 4, an on/off switch 5 and several regulator buttons 13. FIG. 4 is a rear view of the device 100 and includes located in a rear housing 10: a two-dimensional camera 7, identification means or laser pointer 8 and a distance sensor 9. In addition the device 100 of this embodiment includes (in this case not illustrated for simplicity of the figures) an USB port and a charger for power supply of the device 100.

Figure 5A:
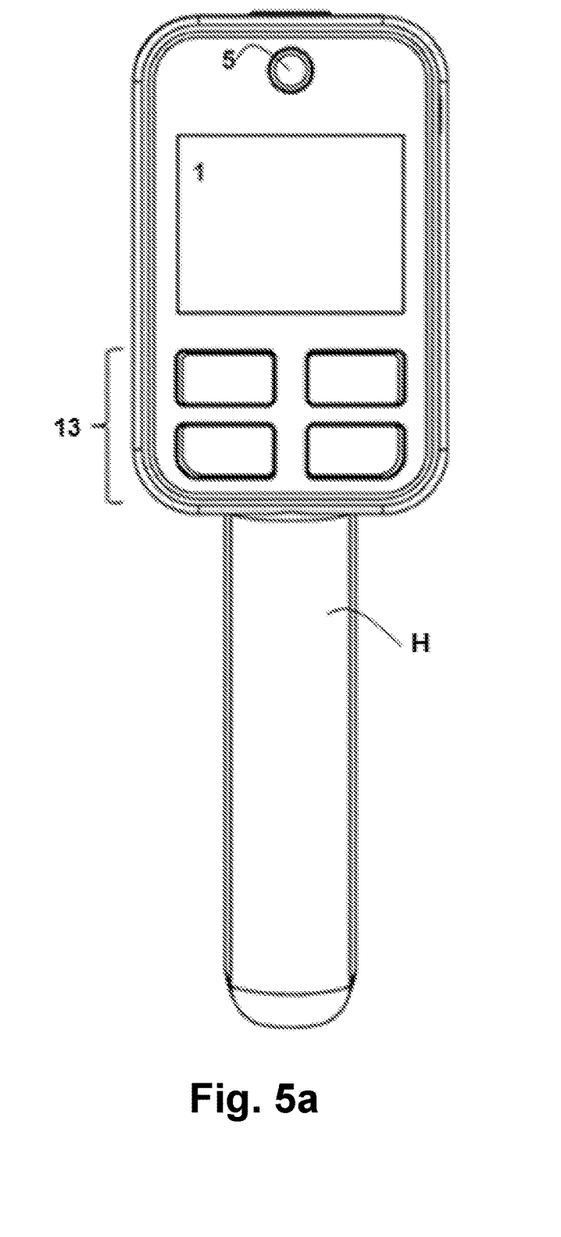
FIG. 5a illustrates the front view.
Figure 5B:
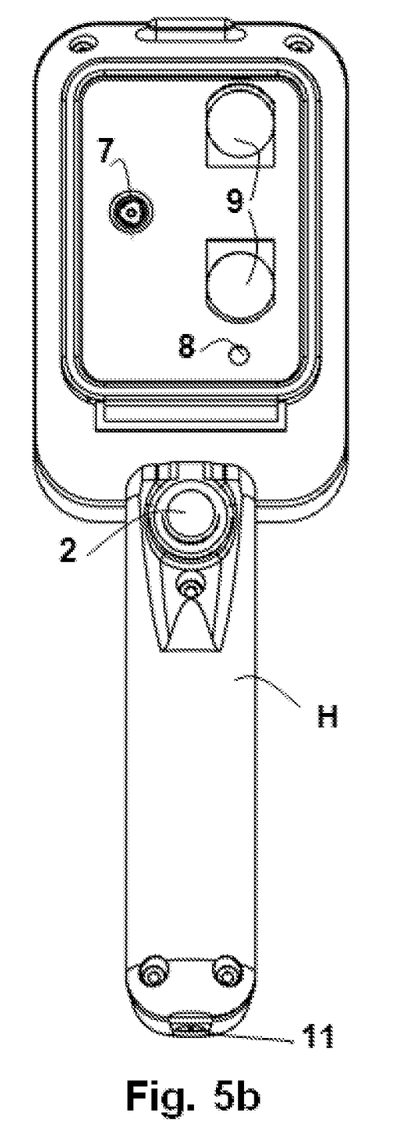
FIG. 5b illustrates the rear view and FIG. 5c is a lateral view.
Figure 5C:
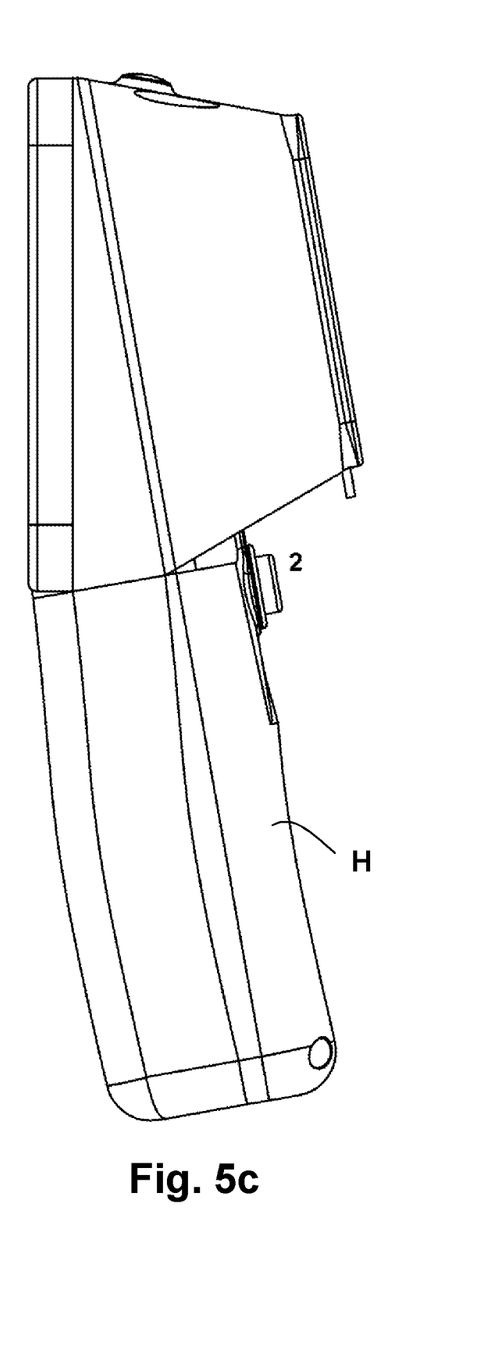

In another example embodiment (see FIG. 5) the device 100 of the second aspect of the invention comprises only one handle H, like a gun-like shape, allowing its use by the operator with a single hand. FIG. 5a is the frontal view of the device 100 and preferably includes a touchpad display 1, an on/off switch 5 and several regulator buttons 6 in order to set up different operation commands of the device 100 and/or to focus/defocus the two-dimensional camera 7. FIG. 5b is the rear view and according to this embodiment includes a two-dimensional camera 7, a distance sensor 9, a laser pointer 8, a charger 11 for power supply of the device 100 and a control button 2 located at the handle H of the device 100 for taking (when pressing it) the two dimensional image, sequence of two dimensional images and/or video images when pressing the control button 2.

Figure 6A:
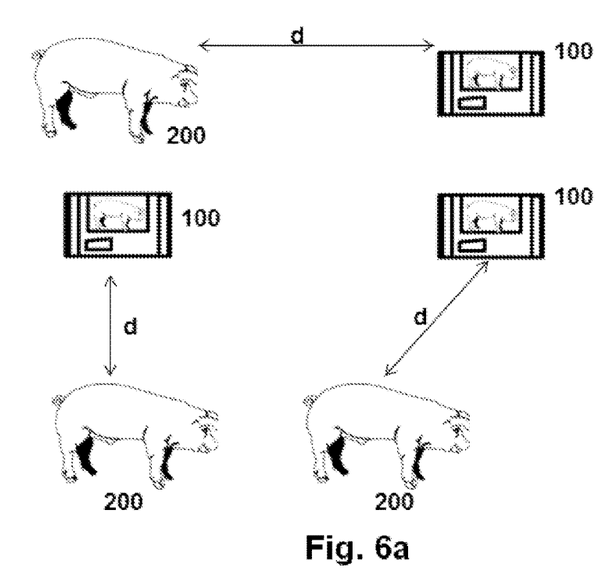
FIGS. 6a and 6b illustrate an embodiment of the invention in which the proposed device is used at a known distance.
Figure 6B:
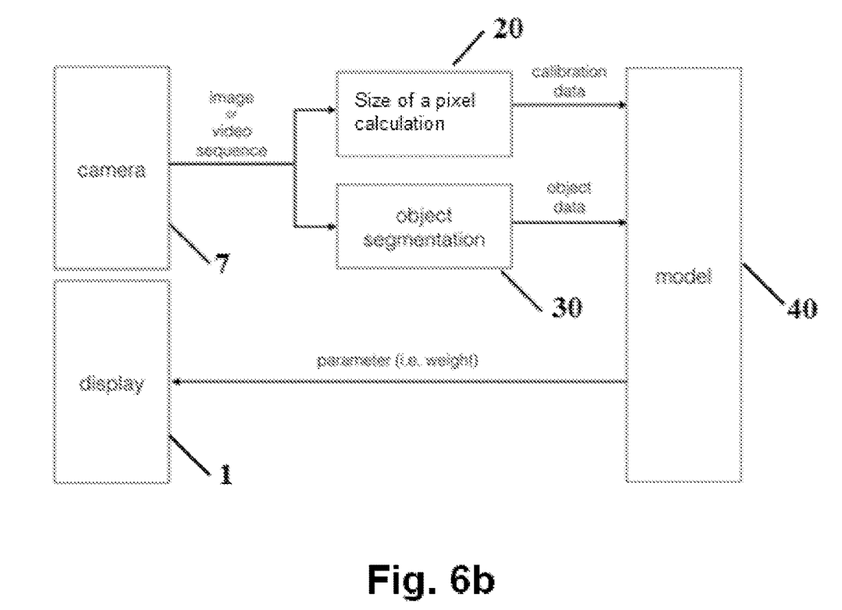

Alternatively, in this case not illustrated, the proposed device 100 can form a box that can be fixed to take data from a static standpoint:

FIGS. 6a and 6b illustrate an embodiment of the invention to perform the automated weighting and parameters calculation (in this case physical parameters) of at least one object 200, in particular a livestock animal such as a pig, however this is not limitative since in the invention the at least one object 200 could be an animal or a human, a crop, turf, compost, people faces, a vehicle, etc. In this particular case, the proposed device 100 requires a two-dimensional camera 7 that preferably will have connectivity to internet, WiFi or some sort of mechanism to transmit data to a processing unit comprising several means which can be included, entirely or in part, on the same device 100 or in a remote server S. According to this embodiment, the device 100 is placed at a known distance d (that is, a known situation in the scene) and a size of the pixel of the object 200 is already known (previously calculated, step 20, according to the teachings of the invention) which enables to precisely calculate the weight (and also if wanted the physical parameters) of the pig 200 based on the following processing steps: pig segmentation 30 preferably based on a color appearance segmentation algorithm; calculation of size of body parts of the pig 200 based on an a priori model, such as the one disclosed in [1], which is kept stored in a memory or database of a computing system; and calculation of pig weight based on an heuristic model 40 calibrated with experimental data.

Generation of said heuristic model 40 is based on a training set of hundred pigs 200 ranging from 70 to 140 Kg. Then, the validation of the heuristic model is done with another sample set (test sample) of hundred pigs ranging from 70 to 140 Kg that have been weighted independently. Finally, the validated model is implemented into the proposed device 100, in any of its exemplary embodiments, for subsequent utilization.

Figure 7:
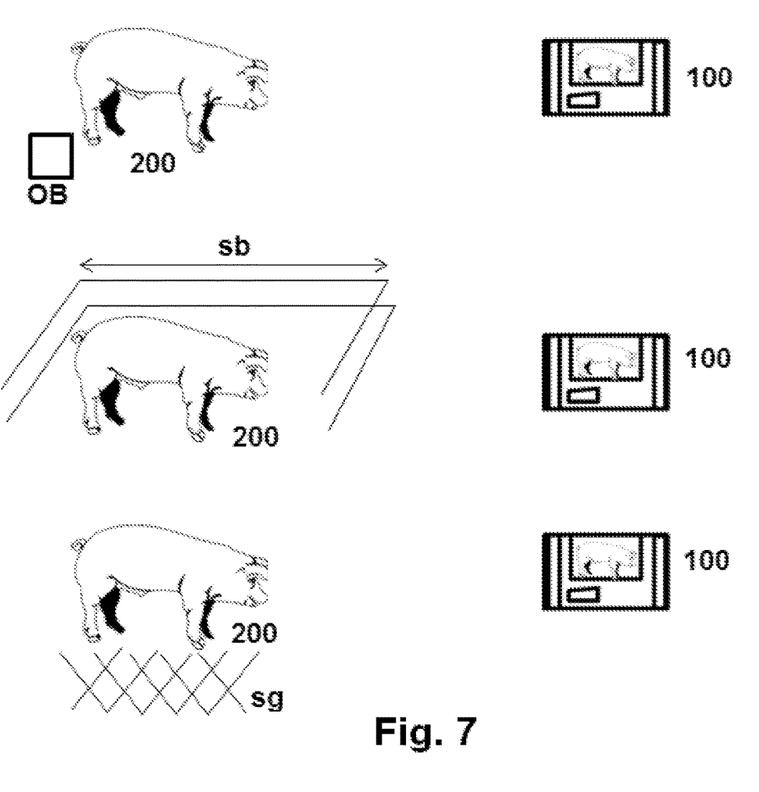
FIG. 7 illustrate another embodiment of the invention in which the image processing is performed by using an a priori knowledge of the scene or by including a reference object on the scene.

In reference to FIG. 7 it is illustrated another embodiment of the invention. In this case, a calibration object OB of a known size, like a green panel of 30 by 30 cm, is placed next to the pig 200. In addition, the pig 200 may be positioned at a known position (a priori knowledge of the scene), e.g. by knowing the size of the batch SB or by knowing the size of a grid or tiles on the floor SG. This enables to precisely calculate parameters of the pig 200 by: segmenting the pig 200 and the calibration object OB based on a color appearance segmentation algorithm; affine registration of the calibration object OB to calculate a spatial transformation and the distance between the device 100 and the pig 200; calculating the pig volume based on a 3D template and a spatial transformation; and calculate the pig weight based on an heuristic model calibrated with experimental data.

Figure 8A:
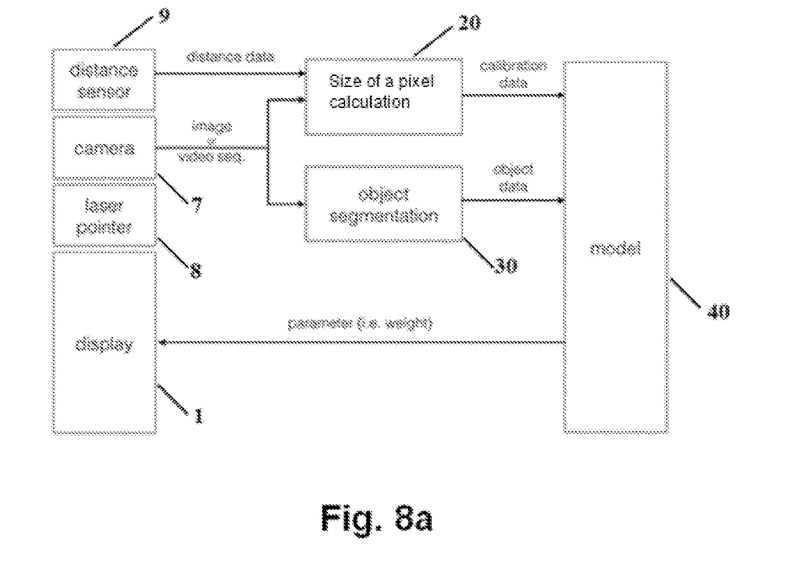
FIGS. 8a and 8b illustrate another embodiment of the invention, similar to the embodiments of FIGS. 6a and 6b, but further including a distance sensor.
Figure 8B:
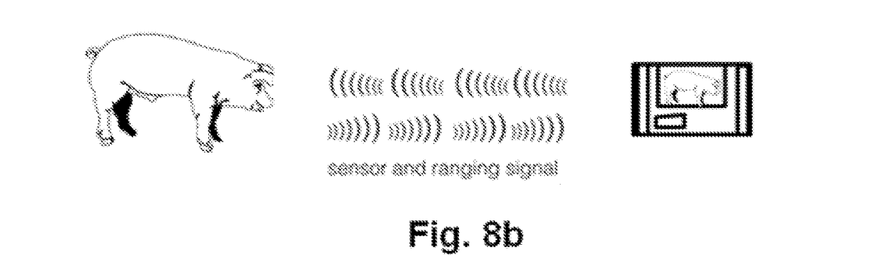

FIGS. 8a and 8b illustrate another embodiment of the invention. In this case, the proposed device 100 requires a two-dimensional camera 7 to acquire a video sequence of images of the pig 200, a distance sensor 9 to measure the distance between the device 100 and the pig 200, and a laser pointer 8 to provide guidance to a user/operator for accurate tagging of the pig 200 to be weighted. The distance sensor 9, or ranging signaling, can be implemented in different manners, for example, by means of a laser than can include a telemeter, a LED, ultrasounds, RF, microwaves, magnets, capacitance, and/or conductivity. Advantageously, the acquisition of video sequences have many advantages for segmentation and weight calculation, i.e. to reject inappropriate frames, increased average, background removal, sensor and video synchronization, among others.

In accordance with another embodiment, in this case not illustrated, the device 100 includes two two-dimensional cameras 7; therefore the calculation is done by including two or more different views of the object or objects 200 improving the parameter calculation of the object 200, or objects 200.

Figure 9:
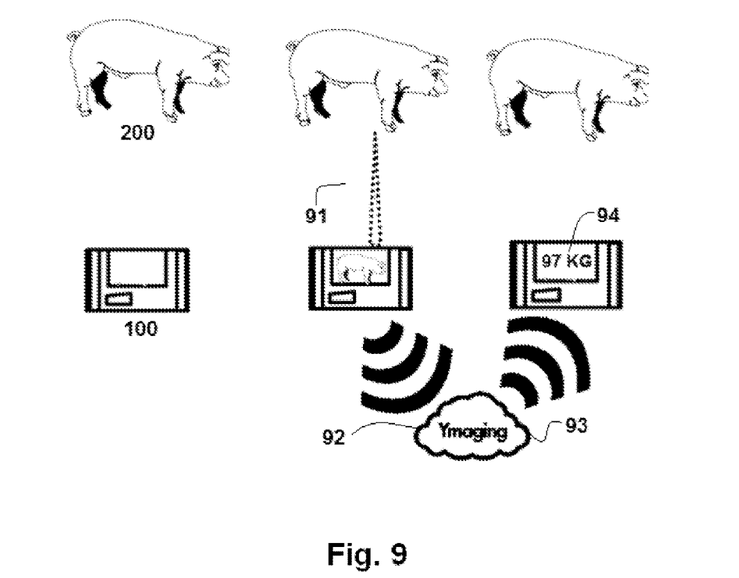
FIG. 9 illustrates an example of use of the proposed device through a cloud service for pig weighting.

In accordance with yet another embodiment, and as seen in FIG. 9, once the two dimensional image (or even the sequence of images and/or the video sequence) is acquired by a user via a computing software application installed the proposed device 100 (step 91), the acquired image is transmitted to a processing unit located in a remote server S of a cloud computing environment in order a computing algorithm running in the remote server S (step 92) validating and processing the received image (in few seconds) enabling in that way additional web services like pig growth monitoring in an ubiquitous manner or building of production maps. Once the data has been processed (step 93) it is transmitted to the proposed device 100 allowing said computing software application displaying (step 94) the calculated value of the parameter.

The centralization of the acquired data within the remote server S leads to additional features, and the number of applications is larger: animal or pig growth, stock management, stock pricing, vision attention for marketing of products, mapping of pig production or reliability of producers, overall yield for a year, and predicted yield for the next season or years.

Finally, in another embodiment, not illustrated, the proposed device 100 requires a two-dimensional camera 7 to acquire a video sequence of images of the pig 200, a distance sensor 9 to measure the distance between the device 100 and the pig 200, and a synchronization signaling to synchronize the distance measurements and video sequences by temporal tagging based on a GMT reference.

Figure 10:
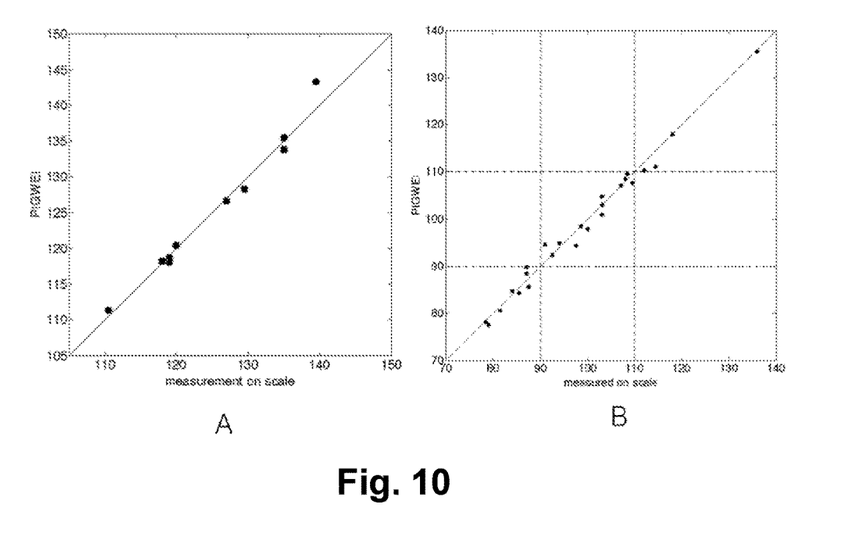
FIG. 10 illustrates some experimental results on pig weighting for two different days: (A) 10 pigs with special feeding and (B) evaluation of 25 pigs on normal growth.

FIG. 10 shows the results of one of the proposed embodiments in real data compared with scale results on two different tests. FIG. 10A shows data on 10 pigs that were fed with special food and were overweight, RMSE=1.47 Kg, Pearson's rho=0.99. FIG. 10B shows data on a wide range of 25 pigs, RMSE=1.72 Kg, Pearson's rho=0.99.

While this description covers many specific implementation details, these should not be construed as limitations on the scope of the invention or of what may be claimed, but rather as a description of features specific to particular embodiments of the invention.

The scope of the present invention is defined in the following attached claims.

The invention claimed is:

1. A method for automated parameters calculation of an object, or part of an object, the method comprising:
   acquiring, by at least one two-dimensional camera of a portable device, in a scene, a two-dimensional image of at least one object including an animal, a human, a crop or gardening culture or a vehicle, wherein the two dimensional image is acquired from any angle and distance with respect to the object, and wherein the two dimensional image is not acquired from a predetermined position;

identifying, by a processing unit, the object within the acquired two-dimensional image by segmenting said two-dimensional image via a segmentation algorithm;

calculating, by said processing unit, the size of a pixel of the object in the acquired and segmented two-dimensional image using a measured distance between the object and the two-dimensional camera without using an object or feature of a known size included in the scene as reference for size calibration; and calculating, by the processing unit, several parameters, including at least the size, dimensions, body part dimensions, body features, weight, or volume, of the object by using said acquired two-dimensional image, the calculated size of the pixel, and an a priori model of the object including information linking different parts, contours or shapes representative of several objects, previously acquired with a two-dimensional camera, with several parameters including the size, dimensions, body part dimensions, body features, weight, or volume of said several objects.

2. The method of claim 1, wherein said a priori model is stored in a memory or database.

3. The method of claim 1, wherein said acquiring step further comprises acquiring at least one of a sequence of two-dimensional images and video images of the object.

4. The method of claim 1, wherein the processing unit is included in a remote server, distant to the at least one two-dimensional camera, wherein the remote server comprises building a map to represent a spatial distribution of the calculated parameters of the object, to monitor a temporal evolution of the calculated parameters of the object, or to perform a combination of a represented spatial distribution of the calculated parameters of the object and a monitored temporal distribution thereof.

5. The method of claim 4, wherein the object is an animal including at least a pig, a piglet, a cow, veal or a sheep, and wherein said built map is used to optimize at least pig growth or mapping of pig production or reliability of producers.

6. The method of claim 4, wherein the object is a crop or gardening culture, including at least a turf, fruits, vegetables, olives, grapes, tomatoes, cucumbers, hazelnuts, or cotton, and wherein said built map is used to optimize at least crop management, turf management, compost management, stock management, stock pricing or an overall yield for a year or a predicted yield for the next season or years.

7. The method of claim 4, wherein the object is the face of a person or a group of people, and wherein said built map is used to optimize at least vision attention.

8. The method of claim 1, wherein the object is a vehicle and the method further comprises using the calculated parameters of the object to compute the probability of bumping or collision between two or more vehicles.

9. The method of claim 1, wherein the body features comprises a body fat index.

10. A portable device for automated parameters calculation of an object, or part of an object, comprising:
at least one two-dimensional camera, provided to point to at least one object, including an animal, a human, a crop or gardening culture, or a vehicle, said two-dimensional camera being configured to acquire in a scene at least one two-dimensional image of the at least one object from any angle and distance with respect to the object, said two-dimensional image not being acquired from a predetermined position;

a distance sensor configured to measure a distance between the device and the object; and a processing unit arranged and configured to:
identify the object within the acquired two-dimensional image by segmenting the two-dimensional image via a segmentation algorithm;

calculate the size of a pixel of the object in the acquired and segmented two-dimensional image using the measured distance between the object and the device without using an object or feature of a known size included in the scene as reference for size calibration; and calculate several parameters, including at least the size, dimensions, body part dimensions, body features, weight, or volume, of the object by using said acquired two-dimensional image, the calculated size of the pixel, and an a priori model including information linking different parts, contours or shapes representative of several objects, previously acquired with a two-dimensional camera, with several parameters including the size, dimensions, body part dimensions, body features, weight, or volume of said several objects.

11. The device of claim 10, wherein said distance sensor includes an ultrasound sensor, a microwave sensor, or a LED or laser telemetry sensor.

12. The device of claim 11, further comprising a laser pointer arranged and configured to identify the at least one object in the scene.

13. The device of claim 11, further comprising a unit arranged and configured to associate the distance measured by the distance sensor with a device to take at least a two-dimensional image.

14. The device of claim 10, wherein the device is embedded in an unmanned vehicle including an aerial vehicle, a terrestrial vehicle or a maritime vehicle.

15. A method for automated parameters calculation of an object, or part of an object, the method comprising:
acquiring, by at least one two-dimensional camera of a portable device, in a scene, a two-dimensional image of at least one livestock animal, wherein the two dimensional image is acquired from any angle and distance with respect to the livestock animal, and wherein the two dimensional image is not acquired from a predetermined position;

identifying, by a processing unit, the livestock animal within the acquired two-dimensional image by segmenting said two-dimensional image via a segmentation algorithm;

calculating, by said processing unit, the size of a pixel of the livestock animal in the acquired and segmented two-dimensional image using a measured distance between the livestock animal and the two-dimensional camera without using an object or feature of a known size included in the scene as reference for size calibration; and calculating, by the processing unit, several parameters, including at least the size, dimensions, body part dimensions, body features, weight, or volume, of the livestock animal by using said acquired two-dimensional image, the calculated size of the pixel, and an a priori model of the livestock animal including information linking different parts, contours or shapes representative of several livestock animals, previously acquired with a two-dimensional camera, with several parameters including the size, dimensions, body part dimensions, body features, weight, or volume of said several livestock animals.

\* \* \* \* \*